United States Patent [19]

Cassens, Jr.

[11] 4,166,748
[45] Sep. 4, 1979

[54] PLASTIC CHROME ORE

[75] Inventor: Nicholas Cassens, Jr., Pleasanton, Calif.

[73] Assignee: Kaiser Aluminum & Chemical Corporation, Oakland, Calif.

[21] Appl. No.: 900,540

[22] Filed: Apr. 27, 1978

Related U.S. Application Data

[63] Continuation-in-part of Ser. No. 827,642, Aug. 25, 1977, abandoned.

[51] Int. Cl.² ............................................. C04B 35/42
[52] U.S. Cl. ..................................................... 106/66
[58] Field of Search ............................ 106/59, 66, 73

[56] References Cited

U.S. PATENT DOCUMENTS

| 2,407,725 | 9/1946 | Schoenlaub | 106/58 |
| 3,208,862 | 9/1965 | Davies et al. | 106/66 |
| 3,297,458 | 1/1967 | Mikami | 106/59 |

FOREIGN PATENT DOCUMENTS 553759  3/1958  Canada ..................................... 106/66

Primary Examiner—James Poer
Attorney, Agent, or Firm—Paul E. Calrow; Malcolm McQuarrie

[57] ABSTRACT

A plastic chrome ore is made from an admixture of sized chrome ore, sodium silicate, hectorite, and sufficient water to form a plastic mass. It may contain a plasticizer such as plastic kaolin clay in addition to the hectorite.

18 Claims, No Drawings

PLASTIC CHROME ORE

CROSS-REFERENCE TO RELATED APPLICATION

This application is a continuation-in-part of application Ser. No. 827,642, filed Aug. 25, 1977, now abandoned.

BACKGROUND OF THE INVENTION

This invention concerns refractories and particularly plastic chrome ore compositions.

Plastic chrome ores are well known in the refractories industry, for example as described in U.S. Pat. Nos. 2,792,311, 2,965,505, and 3,297,458, the disclosures of the later two being incorporated herein by reference.

U.S. Pat. No. 3,297,458 is concerned with solving the problem that some plastic chrome ore refactory compositions bloat or swell under conditions of rapid heating. Specifically, it discloses the addition of floc or asbestos in minor amounts to these compositions to prevent such swelling or bloating.

Although the compositions of U.S. Pat. No. 3,297,458 have proven successful in the marketplace, particularly when they include asbestos, there is some concern that asbestos may pose a health hazard, and accordingly it has been desired to produce a non-bloating plastic chrome ore composition which does not require the use of asbestos.

The present invention is directed to the solution of this problem.

BRIEF DESCRIPTION OF THE INVENTION

It has now been found, according to this invention, that a substantially non-bloating plastic chrome ore can be made from a composition consisting essentially of: (a) from 85 to 95% size-graded chrome ore; (b) from 1 to 5% sodium silicate binder; (c) from 0.5 to 5% hectorite; (d) from 0 to 5% of a plasticizer other than hectorite; all percentages being by weight and based on the total dry weight of the ingredients; and (e) sufficient water to form a plastic mass.

DETAILED DESCRIPTION

The chrome ore used can be any of such materials, either natural or synthetic, well known in this art. It will be sized to achieve good density upon placement, as is also well understood. For example, it may all be less than 9.5 mm in diameter (i.e., all pass a ⅜ inch mesh screen) and roughly one-third will be greater than 2 mm in diameter (i.e., retained on a 9 mesh screen), roughly one-third will be less than 2 mm in diameter and be greater than 0.15 mm in diameter (i.e., retained on a 100 mesh screen), and roughly one-third will be less than 0.15 mm in diameter.

Hectorite is a hydrous silicate of magnesium and lithium, sometimes containing fluorine, and occurs naturally near Hector, Calif. It has also been produced synthetically, and either form can be used in this invention. However, the natural material, and particularly a refined grade of the natural material, is preferred. Hectorite is a well known material which has been used in many compositions, including refractory gun mixes, for example as disclosed in U.S. Pat. No. 2,407,725. It has also been used as a coating on refractory material, for example chrome ore, as disclosed in U.S. Pat. No. 2,406,910.

The sodium silicate may be any of the many well known varieties of that common binder material. It is believed that it is the swelling action of the sodium silicate binder upon drying which leads to the bloating of these plastic chrome compositions, and that such bloating tendency is higher when a sodium silicate of relatively high silica content is used. Accordingly, this invention is particularly useful with such high silica sodium silicates. The sodium silicate can be added either dry or in liquid form; the latter form has proven to be particularly convenient. However, in whichever form (dry or liquid solution) the sodium silicate is added, the percentage amounts in the specification and claims refer to the amount of dry material added. In other words, if a solution is added, the percent of sodium silicate added is the amount of that material in the solution (i.e., the amount obtained upon drying the solution). Other, equivalent alkali metal silicates, for example lithium silicate, can be used.

While a plasticizer is not essential, it is found to impart improved workability to the plastic chrome ore. The plasticizer can be any of the many well known materials of this type, for example an organic material such as methyl cellulose. However, a clay, particularly a plastic kaolin type of clay, has proved particularly useful in this invention.

As used in this specification, the term "clay" means a hydrous aluminosilicate type of mineral, for example of the kaolinite type, which exhibits lubricity and plasticity when admixed with water. See, for example, the definition of "clay" in *Ceramic Glossary* (American Ceramic Society, 1963.) The term "clay" is particularly to be distinguished from the hectorite used in the present invention, which is a magnesium silicate mineral.

It is possible to omit entirely the plasticizer in the composition, relying on, and perhaps increasing the amount of, the hectorite to provide the workability desired in the composition. However, this approach will generally prove uneconomic since there are many clay materials which are considerably cheaper than hectorite.

The sized chrome ore and other ingredients will be mixed together, for example in a Muller mixer, and sufficient water added to form a plastic mass. The precise amount of water added will depend on the types and amounts and sizing of materials used, including the form in which the sodium silicate is added, but will generally range between 1 and 5% by weight, based on the total weight of the composition.

The composition can also contain other ingredients without departing from the scope of this invention. For example, it can contain a sequestering agent (for example, ethylene diamine tetra-acetic acid), which prevents premature reaction, and consequent setting of the mix, between the sodium silicate binder and any stray magnesia which may have gotten into the composition.

As used in the specification and claims, the term "based on the total dry weight of the ingredients" means that the weight percents given are based on the amount of material which would be found in the composition after it was dried; that is to say, after any water, either water added to form the plastic mass, or water added as part of the sodium silicate binder solution, or water added with the sequestering agent solution, has been removed.

EXAMPLE

A plastic chrome ore according to this invention was made from 88.3 parts sized Transvaal chrome ore, 7.83 parts RU grade sodium silicate (a water solution of sodium silicate made by Philadelphia Quartz Co. having 13.8% $Na_2O$, 33.2% $SiO_2$ and a $SiO_2:Na_2O$ ratio of 2.4:1), 2.62 parts Hamilton II clay (a plastic kaolin), 0.25 parts Versene (an ethylene diamine tetra-acetic acid sequestering agent) and 1 part Baroid Macaloid, a refined hectorite ore. A 15 kg batch of this composition was mixed in a small Muller mixer, together with 2.2 parts of water (in addition to the water contained in the sodium silicate solution). As will be apparent, the admixture contained on the dry basis 92.4% chrome ore, 3.9% sodium silicate, 2.7% clay, and slightly over 1% hectorite.

The Transvaal chrome ore was sized so that all was less than 9.5 mm in diameter (i.e., all passed a ⅜ inch mesh screen) and 28.1 parts were greater than 2 mm in diameter (i.e., were retained on a 9 mesh screen), 28.1 parts were smaller than 2 mm and larger than 0.15 mm (i.e., retained on a 100 mesh screen), and 32.1 parts were smaller than 0.15 mm. The chrome ore over 2 mm in size had the following typical chemical analysis (ignited basis): 11.1% MgO, 0.4% CaO, 8.2% $SiO_2$, 14.5% $Al_2O_3$, 39.7% $Cr_2O_3$, and 26.1% $Fe_2O_3$; and that under 2 mm in size, a beneficiated ore, the following typical analysis: 44.1% $Cr_2O_3$, 28.7% $Fe_2O_3$, 15.1% $Al_2O_3$, 9.7% MgO, 0.2% CaO, and 2.2% $SiO_2$. The Hamilton clay and the hectorite were both substantially all less than 44 microns in size (i.e., both all passed a 325 mesh screen), and the Versene was in the form of a water solution.

This composition was tested for bloating by hand ramming it into a can 10.5 cm in diameter by 12 cm high using a 20 mm (¾ in) diameter steel rod. The excess material was cut off with the edge of a trowel and the top surface smoothed. Four vent holes were made in the exposed surface with a 3 mm (⅛ in) diameter welding rod to a depth of 5 cm (2 in). After the material had dried for 48 hours at room temperature and then dried in an oven for 16 hours at 120° C. (250° F.), the height of the specimen above the rim of the can was measured and found to be 11.5 mm (0.46 in). The material was also stored in plastic bags for a total of 16 weeks, after which time it still remained plastic.

This composition can be compared with another composition made in the same way except that, in place of the hectorite, 1 part Volclay, a plastic bentonite clay, was used, and 1.5 parts water were used. Although this comparison composition remained plastic after storage for 12 weeks, in the bloat test it showed an increased height of 23.5 mm (0.92 in), an unacceptably high amount.

In addition to the two foregoing compositions, additional similar compositions were made using the following additives in place of the hectorite or Volclay bentonite: alumina dust collector fines, perlite, expanded vermiculite, both chopped and ball milled aluminosilicate glass fibers, cattle hair, volatilized silica, kyanite, rice hull ash, mica, wollastonite, pyrophyllite, fibrous talc, diatomaceous earth, and waste material from rug manufacture. Many of these comparison compositions failed to maintain their plasticity during storage, becoming set in a matter of a week or two. Others, although they did not set up prematurely, showed bloating of from 20 to 44 mm (0.78 to 1.73 in), all unacceptably high.

For comparison purposes, a similar composition made with 1 part asbestos, as taught by U.S. Pat. No. 3,297,458, showed a bloat of 11.5 mm (0.45 in), with good storage for 16 weeks.

Each of the bloat heights reported is the average of two separate tests on the same composition.

Although the reason why hectorite, and the previously known asbestos and floc, prevent excessive bloating of these plastic chrome ore compositions is not known with certainty (and applicant does not wish to be bound to any theory), the results of a very large number of tests indicate that as the rammed bulk density of the compositions increases, their tendency to bloat also increases. From these results, the following empirical equation relating bloat height (in inches) to rammed density (in pounds per cubic foot, pcf) has been developed:

(1) Bloat$= -13.57 + 0.067 \times$Density; or, in metric units, (2) Bloat (mm)$= -344.7 - 106.1 \times$Density (g/cc).

From many years experience with these plastic chrome compositions, it has been determined that a bloat (in the standard test described) of 16 mm (0.625 in) is the maximum acceptable if the composition is to perform satisfactorily in service. From the above empirical relationship, it can be determined that compositions with an acceptably low bloat will have a rammed bulk density of less than about 3.4 g/cc (212 pcf). From these many tests, it appears that only hectorite (or asbestos or floc) additions yield compositions with an adequately low rammed bulk density to have adequately low bloat, combined with good storage life. In other words, it appears that the inclusion of these materials in the composition leads to a relatively low density, an open structure which permits any expansion which occurs upon heating of the sodium silicate to be absorbed within voids in the structure, rather than expanding the structure of the refractory itself.

In the specification and claims, percentages and parts are by weight unless otherwise indicated. Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, a 100 mesh screen opening corresponds to 147 microns. Analyses of mineral components are reported in the usual manner, expressed as simple oxides, e.g. MgO and $Cr_2O_3$, although the components may actually be present in various combinations, e.g. as a magnesium chromite.

What is claimed is:

1. A substantially non-bloating plastic chrome ore refractory composition consisting essentially of: (a) from 85 to 95% size-graded chrome ore; (b) from 1 to 5% sodium silicate binder; (c) from 0.5 to 5% hectorite; and (d) from 0 to 5% of a plasticizer other than hectorite; all percentages being by weight and based on the total dry weight of the ingredients; and (e) sufficient water to form a plastic mass.

2. Composition according to claim 1 wherein the hectorite is a natural hectorite.

3. Composition according to claim 2 wherein the natural hectorite is a refined hectorite.

4. Composition according to claims 1, 2 or 3 containing from 0.1 to 5% plasticizer.

5. Composition according to claim 4 containing, as plasticizer, from 1 to 5% clay.

6. Composition according to claim 5 wherein the clay is of the plastic kaolin type.

7. Composition according to claim 1 wherein the sodium silicate binder is added as a liquid solution.

8. Composition according to claim 7 wherein the hectorite is a natural hectorite.

9. Composition according to claim 8 wherein the natural hectorite is a refined hectorite.

10. Composition according to claims 7, 8 or 9 containing from 0.1 to 5% plasticizer.

11. Composition according to claim 10 containing, as plasticizer, from 1 to 5% clay.

12. Composition according to claim 11 wherein the clay is of the plastic kaolin type.

13. Composition according to claim 1 wherein the chrome ore is of the Transvaal type.

14. Composition according to claim 13 wherein the hectorite is a natural hectorite.

15. Composition according to claim 14 wherein the natural hectorite is a refined hectorite.

16. Composition according to claims 13, 14 or 15 containing from 0.1 to 5% plasticizer.

17. Composition according to claim 16 containing, as plasticizer, from 1 to 5% clay.

18. Composition according to claim 17 wherein the clay is of the plastic kaolin type.

* * * * *

UNITED STATES PATENT AND TRADEMARK OFFICE
CERTIFICATE OF CORRECTION

PATENT NO. : 4,166,748
DATED : September 4, 1979
INVENTOR(S) : Nicholas Cassens, Jr.

It is certified that error appears in the above-identified patent and that said Letters Patent are hereby corrected as shown below:

Column 4, line 23, "-106.1" should be --+106.1--

*Signed and Sealed this*

*Twenty-fifth* Day of *March 1980*

[SEAL]

Attest:

SIDNEY A. DIAMOND

*Attesting Officer*  *Commissioner of Patents and Trademarks*